Feb. 1, 1944. J. H. STALEY 2,340,707
SHOP ENGINE STAND REVOLVING MEANS
Filed Nov. 17, 1941  3 Sheets-Sheet 1
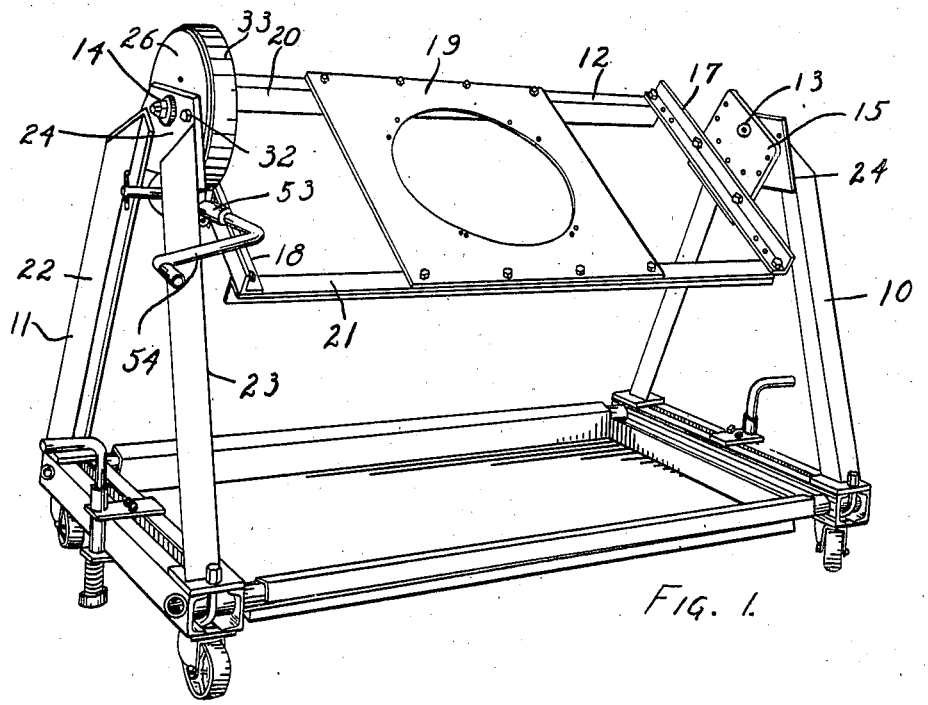
Fig. 1.
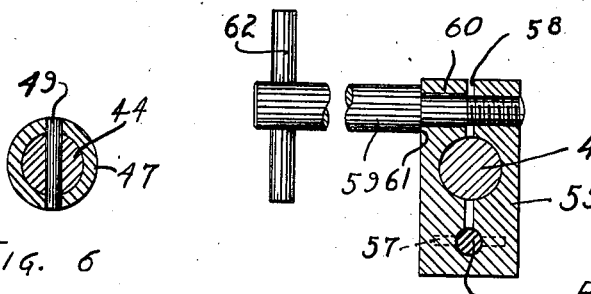
Fig. 6.
Fig. 4.
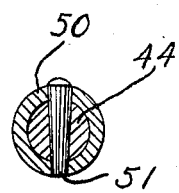
Fig. 5.
INVENTOR,
JOSEPH H. STALEY,
By Minturn & Minturn,
ATTORNEYS.

Feb. 1, 1944.   J. H. STALEY   2,340,707
SHOP ENGINE STAND REVOLVING MEANS
Filed Nov. 17, 1941   3 Sheets-Sheet 3

INVENTOR,
JOSEPH H. STALEY,
BY Minturn Minturn
ATTORNEYS.

Patented Feb. 1, 1944

2,340,707

UNITED STATES PATENT OFFICE 2,340,707

SHOP ENGINE STAND REVOLVING MEANS

Joseph H. Staley, Columbus, Ind.

Application November 17, 1941, Serial No. 419,405

5 Claims. (Cl. 74—425)

This invention relates to an engine stand of that type on which engines may be secured during the process of assembling or disassembling as the case may be in original manufacturing or in tearing down under inspections and checkups, and relates particularly to means for rocking engine supporting members around a horizontal axis to any desired position even through 360 degrees of travel and holding any position of that member positively without backlash or shifting from that position in any small degree.

Important objects of the invention are to provide an exceedingly simple structure which may be low in weight, substantially "foolproof," and at the same time be of such construction as to avoid accidents involving the operator.

A still further important object of the invention is to provide a structure of the above indicated nature which may assume a form permitting it to occupy a relatively small space but at the same time will not shift to bind or permit lost motion.

Figure 2:
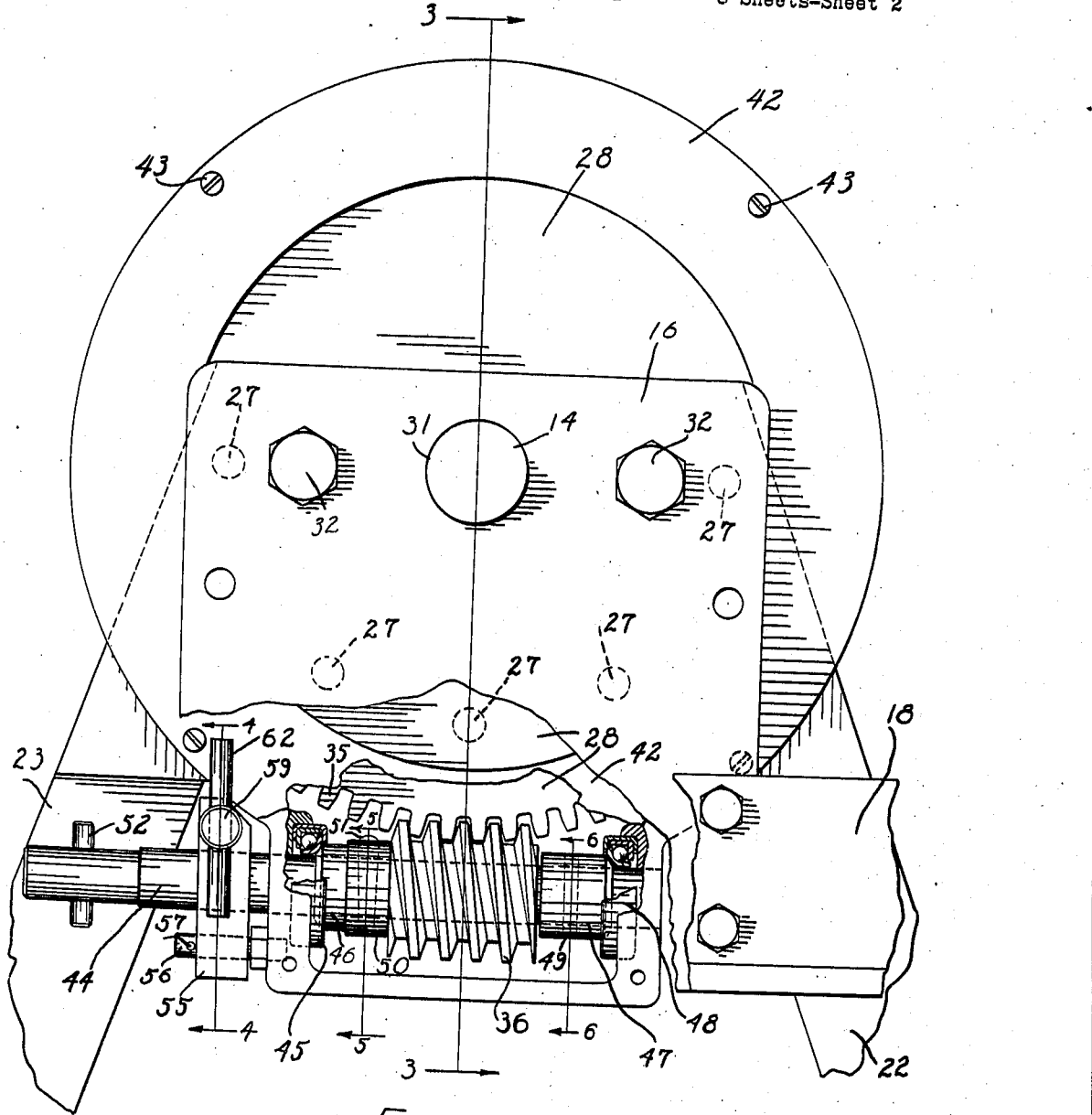
Figure 3:
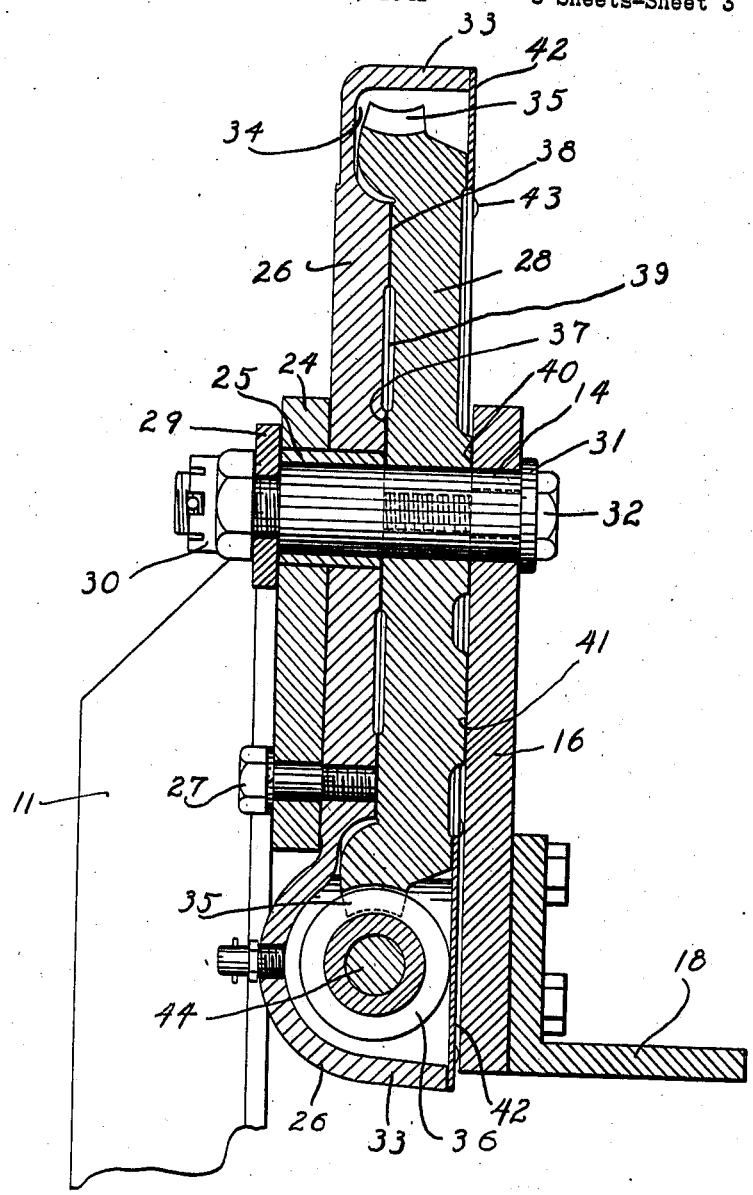

These and many other objects and advantages of the invention will become apparent to those versed in the art in the following description of one particular form as illustrated in the accompanying drawings, in which Fig. 1 is a view in perspective of an engine stand to which the invention is applied;

Fig. 2, a view from the inside in vertical elevation, on an enlarged scale, and in partial section, of the revolving mechanism;

Fig. 3, a view in vertical section on the line 3—3 in Fig. 2;

Fig. 4, a view in section on the line 4—4 in Fig. 2;

Fig. 5, a view in section on the line 5—5 in Fig. 2; and

Fig. 6, a view in section on the line 6—6 in Fig. 2.

Like characters of reference indicate like parts throughout the several views in the drawings.

While the invention may be applied to various constructions of engine stands, it is herein shown as applied to a stand employing the spaced apart upwardly extending end frame members 10 and 11 between which is rockably carried an engine supporting frame 12. The frame 12 is mounted upon trunnion bolts 13 and 14 which pass through plates 15 and 16 respectively in turn engaging with the end rails 17 and 18 respectively of the frame 12. Any suitable attachments may be carried by the frame 12 to support the particular engine to be carried thereby. In the present showing, Fig. 1, a base plate 19 is shown as being carried by the two side rails 20 and 21 of the frame 12 on which a radial type of engine may be mounted.

In any event the frame 12 may be swung around the horizontal axis extending through the bolts 13 and 14 so as to vary the position of the motor carried on the frame 12 to permit access to different parts of the engine as may be required. It will be appreciated that engines of the present horse power employed in modern airplanes and tanks have considerable weight and the swinging and maintaining of the frame 12 to and in any desired position is a matter of exertion of quite a little power demanding elimination of slippage and failure.

Referring primarily to Figs. 2 and 3, one of the end frames of the stand, herein shown as the frame 11, is selected as that member on which the revolving means is mounted. In the present form of the invention, this end frame 11 has a pair of inclined angle bores 22 and 23 interconnected at their upper ends by means of a plate 24 in any suitable manner, such as by welding. The plate 24 is horizontally bored through to receive snugly therethrough a sleeve or bushing 25 having a length exceeding the thickness of the plate 24. This bushing 25 is forced into the bore in the plate 24 to have its outer end flush with the outer face of the plate 24 and to have its inner end extending a distance beyond the inner face of the plate 24 equal to the thickness of a housing 26.

This housing 26 has a bore therethrough to receive this projecting end of the bushing 25, as indicated in Fig. 3, to have the inner end of the bushing terminate substantially flush with the inner face of the housing 26. In other words, the bushing 25 is employed as an aligning means for locating the housing 26 on the plate 24. This housing 26 has its outer face around and below the bushing 25 brought into intimate contact with the inner face of the plate 24, and in that position, the housing 26 is secured against rotation about the bushing 25 by any suitable means, such as by cap screws 27 carried through the plate 24 and screw-threadedly engaging the housing 26.

The trunnion bolt 14 is inserted through a hole in the upper part of the frame carrying plate 16, and centrally through a worm wheel 28 and then through the bushing 25 to extend outwardly therebeyond by a threaded end to receive a washer 29 and a nut 30. The threaded portion of the bolt 14 is reduced in diameter from that part of the bolt which extends through the plate 16, wheel 28, and bushing 25, and the length of the major diameter of the bolt 14 is such that when the nut 30 is drawn up snugly to seat the washer 29 against the shoulder at the juncture of the threaded and major diameter portions of the bolt 14, the plate 24 and end of the bushing 25, the head 31 of the bolt 14 will have brought the plate 16 into intimate contact with the face of the wheel 28 and the wheel 28 will be brought into sliding contact with bearing surfaces on the inner side of the housing 26.

The plate 16 is secured to the wheel 28 to revolve therewith in effect as an integral part thereof, by means of cap screws 32 entered through the plate 16 and screw-threadedly engaging the wheel 28. The wheel 28 and its accompanying plate 16 are thus mounted to turn about the axis of the trunnion bolt 14, the bolt 14 being permitted to turn in the bushing 25 or the worm wheel 28 and its accompanying plate 16 being permitted to turn on the bolt 14.

The housing 26 is formed to have a generally inwardly turned flange 33 around its periphery. The housing 26 is provided with an annular channel 34 adjacent this flange 33 to provide a recess into which an offset peripheral portion of the wheel 28 may travel. This peripheral portion of the wheel 28 carries teeth 35 transversely thereacross and of the proper shape and pitch to engage with a worm 36 mounted transversely across and within the lower end of the housing 26. That portion of the housing 26 within which the worm 36 is mounted is offset outwardly under the plate 24 so as to permit centering of the worm with the teeth 35 around the offset portion of the wheel 28 whereby the worm 36 may be carried behind the plate 16 so that the plate 16 may extend downwardly past the worm 36 if desired to permit optional location across the plate 16 of the frame across member 18, this member 18 being preferably shiftable up and down the plate 16 as may be required for the desired swinging of the frame 12 from the axis of the trunnion bolt 14.

The housing 26 is provided with a suitable bearing surface on its inner face against which the opposing face of the worm wheel 28 may bear. In the present form of the invention, Fig. 3, this surface is divided into two areas, one indicated by the numeral 37 at the central part of the housing and the other indicated by the numeral 38 spaced outwardly and removed therefrom by a recess 39. Also the plate 16 is spaced from the inner terminal edge of the housing flange 33 by means of bosses 40 and 41 extending from the face of the wheel 28. This extension of the plate 16 from the housing 26 permits the insertion therebetween of a cover plate 42 secured around the inner end of the flange 33 by any suitable means, such as by screws 43, the lower end of this plate 42 being extended down to cover over that part of the housing 26 within which is mounted the worm 36 so that a lubricant may be maintained within the housing 26 across the lower end thereof and around the worm 36. In the present form, this cover 42 is left open through its central major part.

The worm 36 is fixed on a shaft 44 which is mounted to extend across the lower, pocket end of the housing 26. This shaft 44 is inserted through a hole in the flange 33 in the process of assembly to have its end entered progressively through a ball bearing assembly 45, a thrust collar 46, a bore through the worm 36, a spacing collar 47, a second ball bearing assembly 48, and then finally into a bore through the flange 33 on the opposite side, Fig. 2. A recess is provided in the opposite faces of the flange 33 into which the ball bearing assemblies 45 and 48 are pressed to be frictionally engaged thereby through their outer circumferential surfaces.

With the shaft 44 inserted through the various members as above indicated, and having its end substantially flush with the outer face of the flange 33 on the right-hand side thereof as viewed in Fig. 2, the collar 47 is pushed to have its end bear against the inner race in the ball bearing assembly 48, and maintaining that position, a hole is bored through the collar 47 and the shaft 44; the hole suitably reamed; and a pin 49 driven into that hole with a tight fit to pin the collar 47 to the shaft in a fixed manner. Then the thrust collar 46 is forced against the inner race of the ball bearing assembly 45 by pressing the worm 36 thereagainst. As indicated in Fig. 2, the worm 36 is provided with a hub 50 extending toward the collar 46. Any suitable instrument in the nature of a screw driver may be inserted between the worm 36 and the collar 47 to urge the worm 36 to the left along the shaft 44 and thereby carry the hub 50 firmly against the collar 46 to force that collar 46 into firm engagement with the inner race of the bearing 45 as above indicated. With the worm held in this position, a hole is drilled through the hub 50 and on through the shaft 44 and preferably reamed to form a tapered bore. A taper pin 51 is then driven down through the hub and across through the shaft 44 in the opposite side of the hub, as indicated in Figs. 2 and 5, so as to secure the worm 36 in the position indicated. Thus it is to be seen that by following this method of assembly, the shaft 44 is held against any end play between the bearings 45 and 48 and therefore the worm 36 is accordingly maintained in a fixed position in regard to any travel along its axis of rotation. Obviously the location of the shaft 44 is made to be such that when the worm 36 is assembled as just indicated, the worm 36 will be properly meshed by its teeth with the teeth 35 of the worm wheel 28. Also it is to be pointed out that the teeth 35 on the worm wheel 28 and the teeth of the worm 36 are very accurately cut so that there is no backlash therebetween.

The shaft 44 is provided with a length to have it extend a substantial distance outside of the housing 26, Fig. 2, the end of the shaft preferably terminating within the outer side plane of the end frame member 23 so as to be normally out of the way of the operator. Further this shaft 44 is provided with a cross pin 52 as a means for receiving thereacross the socket 53 of a crank 54, Fig. 1, by means of which crank 54 the worm 36 may be rotated to cause corresponding travel of the worm wheel 28 and its attached plate 16 to produce the desired rocking of the frame 12.

While the teeth of the worm wheel 28 and of the worm 36 are so formed as to prevent turning of the worm 36 by the wheel 28, an additional safety means is provided to prevent any accidental movement of the wheel 28. This safety means consists of a clamping device engaging with the worm shaft 44. A block 55 has a major bore to receive the shaft 44 therethrough with a sliding fit. The block 55 also has a smaller bore to receive a mounting pin 56 therethrough. This mounting pin 56 is secured to the left-hand side of the housing flange 33 and carries a cross pin 57 through its outer portion as a means for preventing shifting of the block 55 longitudinally of the shaft 44. The block is provided with a central slot 58 entering from its top side and extending on down centrally therethrough into the bore through which the pin 56 extends, Fig. 4.

A lock screw 59 is formed to have an end portion 60 reduced in diameter from that of the major part of the screw. The block 55 is bored transversely therethrough and this end portion 60 of the screw is inserted through this bore slidingly through a portion of the block to one side of the slot 58 and screw-threadedly engaging in the other part of the block on the other side of that slot. Then by entering the end portion 60 through that transverse bore in the plug 55, the shoulder 61 existing at the juncture of the end portion 60 with the larger diameter portion of the screw 59 is brought into abutment with the outer side of the block 55 upon sufficient rotation of the screw 59 to cause the screw-threaded end of the portion 60 to be carried transversely along through the block. Then by continuing that rotation of the screw 59, the two parts of the block 55 are pulled one toward the other to grip the shaft 44 therebetween. A cross pin 62 is provided in the outer end of the screw 59 as a handle by which the screw 59 may be rotated into the locking or unlocking positions. Sufficient pressure may be exerted against the shaft 44 by this means to prevent turning thereof even should the crank 54 attempt to be turned.

From the foregoing description of the one form of the invention, it may be observed that the downward pull on the plate 16 under the great weight of an engine that may be carried on the frame 12 tends to set up a bending action on the trunnion bolt 14. However, this bending action is reduced to principally a shear stress since the bushing 25 resists any bending of that part of the bolt extending therethrough and then by reason of the large diameter of the worm wheel 28 affording a bearing surface far removed from its axis and against the inner face of the housing 26, that bending force is then transferred to the short length of the bolt 14 which extends through the plate 16. However, since the plate 16 is of relatively slight thickness, and the diameter of the bolt 14 exceeds that thickness, the stress on the bolt is thus to be seen a shear stress principally rather than a bending stress since it is supported against bending as just described, entirely out to the plate 16. It is to be noted that the plate 16 also bears against the wheel 28 below the bolt 14 so that this plate has no tendency to push out of vertical alignment under end thrusts on the engine on the frame 12. All of this means simply that the frame 12 is rigidly supported at any rocked position without any yield under pressures exerted on the frame during the assembling or disassembling operations. Further it means that this important advantage is obtained by the simple structure above described occupying an extremely small space in respect to the over-all length of the stand.

The worm 36 may turn in a path of lubricant retained in the housing 26 by means of the cover 42.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A mechanical movement comprising an end frame member, a gear back plate; a housing a worm wheel in the housing, said housing formed to bear against said back plate by its back face at least in a zone removed from the wheel axis; a bushing interengaging in a bore in said frame member and an axial bore in said back plate whereby the back plate is radially supported on said bushing and axially aligned with said member bore; a driven member formed to extend across and in contact with the front face of said wheel; a pin extending through a bore in said driven member, through an axial bore in said wheel and through said bushing; means on said pin for retaining said wheel face in sliding contact with said back plate; means for holding said back plate in fixed position against said frame member; means for holding said driven member in fixed position against and circumferentially of said wheel; a worm carried by said back plate in mesh with said wheel; and means for rotating said worm.

2. A mechanical movement comprising an end frame member, a gear back plate; a housing a worm wheel in the housing, said housing formed to bear against said back plate by its back face at least in a zone removed from the wheel axis; a bushing interengaging in a bore in said frame member and an axial bore in said back plate whereby the back plate is radially supported on said bushing and axially aligned with said member bore, a driven member formed to extend across and in contact with the front face of said wheel; a pin extending through a bore in said driven member, through an axial bore in said wheel and through said bushing; means on said pin for retaining said wheel face in sliding contact with said back plate; means for holding said back plate in fixed position against said frame member; means for holding said driven member in fixed position against and circumferentially of said wheel; a worm carried by said back plate in mesh with said wheel; and means for rotating said worm; and the peripheral tooth portion of said wheel being offset rearwardly with said worm mounted accordingly whereby said mounting member may extend and swing across said worm with clearance therebetween.

3. A mechanical movement comprising a fixed member, a driven member, a worm wheel fixed by one face to said driven member; a bearing member carried by said fixed member bearing against the other face of said wheel at least against an area thereof adjacent its periphery; a worm meshing with said wheel and supported from said fixed member; a trunnion pin supporting said driven member and maintaining said wheel in juxtaposition with said bearing member by engaging with said fixed member; and means for rotating said worm; whereby bending moment on said pin is resisted by the bearing imposed between said wheel and said bearing member.

4. A mechanical movement comprising a fixed member, a driven member, a worm wheel fixed by one face to said driven member; a bearing member carried by said fixed member bearing against the other face of said wheel at least against an area thereof adjacent its periphery; a worm meshing with said wheel and supported from said fixed member; a trunnion pin supporting said driven member and maintaining said wheel in juxtaposition with said bearing member by engaging with said fixed member; and means for rotating said worm; whereby bending moment on said pin is resisted by the bearing imposed between said wheel and said bearing member; said bearing member including a housing between said wheel and said fixed member; and aligning and supporting means extending axially from said fixed member into said housing, said pin extending from said wheel into said aligning means and said driven member.

5. A mechanical movement comprising a fixed member, a driven member, a worm wheel fixed by one face to said driven member; a bearing member carried by said fixed member bearing against the other face of said wheel at least against an area thereof adjacent its periphery; a worm meshing with said wheel and supported from said fixed member; a trunnion pin supporting said driven member and maintaining said wheel in juxtaposition with said bearing member by engaging with said fixed member; and means for rotating said worm; whereby bending moment on said pin is resisted by the bearing imposed between said wheel and said bearing member; said wheel having its peripheral tooth portion offset outwardly to overhang said bearing member.

JOSEPH H. STALEY.